Jan. 1, 1924
T. M. COOK
CAR WHEEL
Filed May 2, 1923
1,479,373
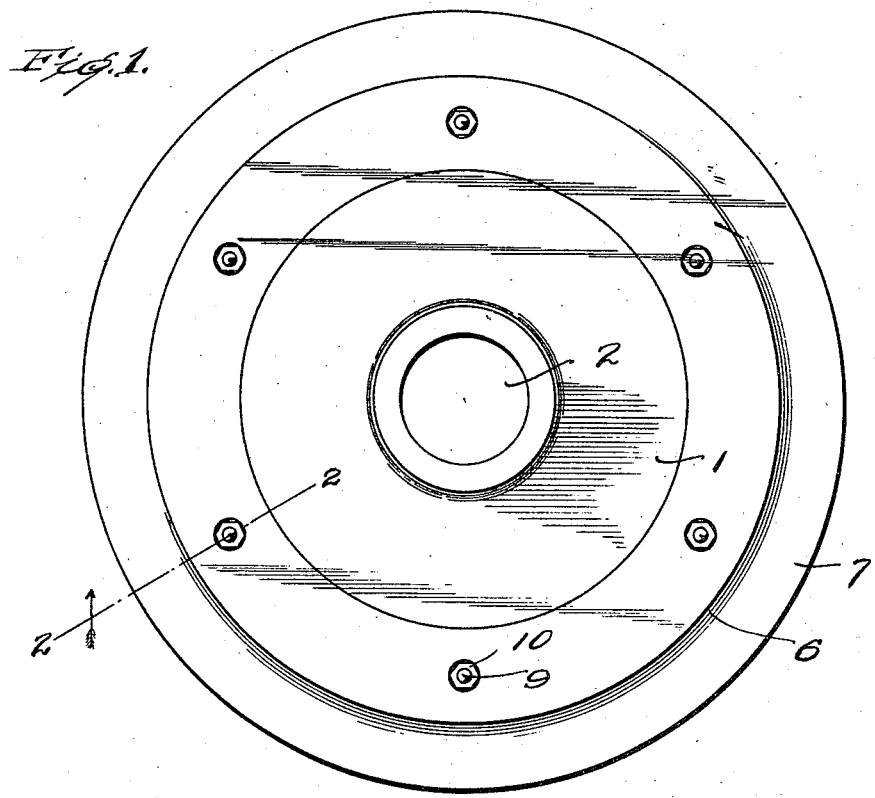
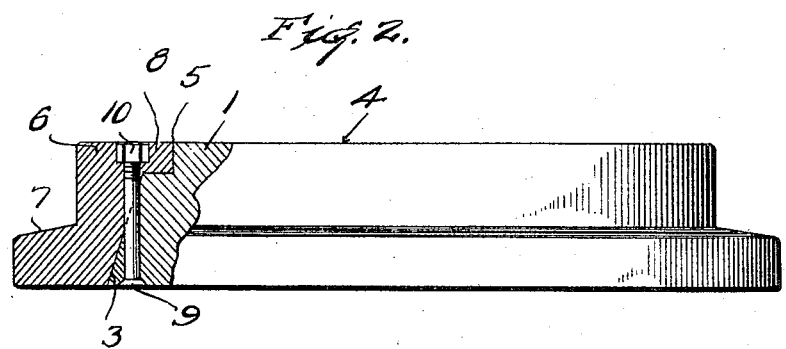

Patented Jan. 1, 1924.

1,479,373

UNITED STATES PATENT OFFICE.

THOMAS M. COOK, OF PHILADELPHIA, MISSISSIPPI.

CAR WHEEL.

Application filed May 2, 1923. Serial No. 636,224.

*To all whom it may concern:*

Be it known that I, THOMAS M. COOK, a citizen of the United States, residing at Philadelphia, in the county of Neshoba and State of Mississippi, have invented certain new and useful Improvements in a Car Wheel, of which the following is a specification.

The present invention relates to railroad car wheels and has for its principal object to provide a structure including a body and a replaceable rim which may be renewed or replaced as may be desired from time to time.

Another important object of the invention is to provide a wheel of this nature which will be simple and efficient in construction, reliable, inexpensive, and well adapted to the purpose for which it is designed.

With the above and numerous other objects in view as will appear as the description progresses, the invention resides in certain novel features of construction, and the combination and arrangement of parts as will be hereinafter more fully described and claimed.

In the drawing—

Figure 1 is an elevation of the car wheel embodying my invention, and

Figure 2 is an edge view thereof showing a portion in section, which section is taken substantially on the line 2—2 of Figure 1 looking in the direction of the arrow.

Referring to the drawing in detail it will be seen that the body 1 of the car wheel is provided with the usual central opening 2. This body 1 is provided with a beveled or tapered periphery 3 that clamps toward the outer side 4 of the wheel. A recess 5 is provided on the outer side of the body 1 communicating with the periphery 3.

A rim 6 is constructed with a flange 7 of conventional construction on its outer periphery and a flange 8 on its inner periphery which is adapted to seat in the recess 5. The inner periphery of the rim is beveled or tapered so as to fit on the periphery of the body 1. A bolt 9 passes transversely through the body 1 and through the rim 6 and the head of this bolt is countersunk in the body and the nut 10 is countersunk in the rim.

It will be seen that this wheel may be readily disassembled so that the rim 6 may be renewed whenever necessary. I prefer to make both the rim and body of steel and there will be no necessity of heating either when the wheel is assembled.

Having thus described my invention what I claim as new is:—

A car wheel of the class described including a body having a periphery beveled and provided with an annular recess, a rim having its outer periphery provided with a flange and its inner periphery provided with another flange and a tapered or beveled surface corresponding with the periphery of the body, said inner flange adapted to be seated in the recess of the body, and a plurality of bolts passing transversely through the body and the rim so as to cross the beveled periphery of the body and the tapered surface of the rim within their marginal edges and to be spaced therefrom for holding the body and rim together in the manner and for the purpose specified.

In testimony whereof I affix my signature in presence of two witnesses.

THOMAS M. COOK.

Witnesses:
ONDA SEWARD,
W. D. COOK.